United States Patent [19]

Noe et al.

[11] 3,946,140

[45] Mar. 23, 1976

[54] ELECTROGRAPHIC RECORDING MATERIAL

[75] Inventors: Robert Joseph Noe; Pierre Jean Rutten, both of Mortsel, Belgium

[73] Assignee: AGFA-GEVAERT N.V., Mortsel, Belgium

[22] Filed: Apr. 12, 1973

[21] Appl. No.: 350,394

[30] Foreign Application Priority Data

Apr. 13, 1972 United Kingdom .............. 17121/72

[52] U.S. Cl. ............... 428/522; 260/80.8; 428/483; 428/511

[51] Int. Cl.[2] ................ G03G 5/022; B32B 27/08: B32B 27/20

[58] Field of Search .............. 117/60, 76 P, 138.8 F, 117/155 UA, 153, 161 UZ, 161 UC, 201, 218, 34; 260/29.6, 85.7, 86.1 R, 86.1 E; 96/1.5, 87 A

[56] References Cited

UNITED STATES PATENTS

| | | | |
|---|---|---|---|
| 3,011,918 | 12/1961 | Silvernail et al. | 117/201 |
| 3,110,621 | 12/1963 | Doggett et al. | 117/218 |
| 3,245,786 | 4/1966 | Cassiers et al. | 96/1 |
| 3,264,137 | 8/1966 | Gess | 117/201 |
| 3,348,970 | 10/1967 | Gess | 117/201 |
| 3,477,871 | 11/1969 | van Westrenen | 117/155 |
| 3,479,215 | 11/1969 | Cavagna et al. | 117/201 |
| 3,503,916 | 3/1970 | Warson et al. | 260/29.6 |
| 3,530,080 | 9/1970 | Inskip | 260/8 |
| 3,595,691 | 7/1971 | Verhille et al. | 117/201 |
| 3,619,284 | 11/1971 | Ray-Chaudhuri et al. | 117/201 |
| 3,620,828 | 11/1971 | Werdouschegg | 117/201 |
| 3,634,135 | 1/1972 | Akiyama et al. | 117/221 |
| 3,639,640 | 2/1972 | Gager | 117/224 |
| 3,640,709 | 2/1972 | Kondo et al. | 96/1.5 |
| 3,672,982 | 6/1972 | Travers | 117/201 |
| 3,681,070 | 8/1972 | Timmermann et al. | 96/1.5 |
| 3,726,709 | 4/1973 | Garratt et al. | 117/93.31 |
| 3,746,671 | 7/1973 | Zima et al. | 260/8 |
| 3,759,744 | 9/1973 | Schliesman | 117/218 |
| 3,786,002 | 1/1974 | van Paesschen et al. | 252/500 |

FOREIGN PATENTS OR APPLICATIONS

| | | |
|---|---|---|
| 950,624 | 2/1964 | United Kingdom |

*Primary Examiner*—P. E. Willis, Jr.
*Attorney, Agent, or Firm*—William J. Daniel

[57] ABSTRACT

A non-photoconductive insulating layer for use in an electrographic recording material comprises a copolymer of 50 to 91 % by weight of vinyl acetate, 8 to 50 % by weight of a vinyl ester of a fatty acid of 12 to 18 carbon atoms, and 0 to 2 % by weight of crotonic acid.

13 Claims, No Drawings

ELECTROGRAPHIC RECORDING MATERIAL

This invention relates to an electrographic recording material adapted for use in electrographic printing processes, and to a method of making such an electrographic recording material.

Different electrographic printing processes have been described by R. M. Schaffert in Electrophotography, The Focal Press, London and New York (1965), p. 111–125. They include the electrostatic recording by electrical discharge or with an electron beam, xeroprinting, and stencil printing with electrostatics. In the same book, on pages 87–96, Schaffert also described the different processes for the transfer of electrostatic images, wherein electrostatic surface charges are transferred to, or reproduced on other dielectric surfaces. J. J. Rheinfrank and L. E. Walkup at the Thirtheenth Annual Meeting of the Technical Association of the Graphic Arts, June 12–14, 1961 have given a survey of the "current status of electrostatic reproduction processes" (Preprints, pages 112–138). Herein also the different processes of electrostatic electrophotography have been described.

According to a special method of electrographic printing a paper support carrying a dielectric or insulating layer is moved over an earthed support under electroconductive styli, which are mounted in such a way that they are insulated from one another. The paper moves in close proximity to the styli. To these styli a voltage is applied pulsatingly in accordance with a controlled pattern, which is supplied by a measuring apparatus or a computer, so that charges can be generated on the dielectric or insulating layer. The charged areas of the dielectric layer can be made visible e.g. by means of a coloured resin powder sticking to the charged areas. This resin powder can be melted in situ as a result of heating of the paper and thus forms a permanent image of the charged areas.

It is obvious that in this method the surface of the paper support has to be sufficiently insulating to retain the electrostatic charges applied thereto for at least several minutes. The electrical properties of the surface should hardly alter with changing relative humidity.

The invention provides an electrographic recording material containing an insulating layer that is free from photoconductive substances and that retains electrical charges for at least several minutes and for a sufficiently long time to yield a visible image of the electrostatic charges applied thereto by known development of the latent electrostatic image.

According to the invention there is provided a non-photoconductive insulating layer for use in an electrographic recording material, said insulating layer comprising a copolymer of 50 to 91 % by weight of vinyl acetate, 8 to 50 % by weight of a vinyl ester of a fatty acid of 12 to 18 carbon atoms, and 0 to 2 % by weight of crotonic acid. Preferably, however, the copolymer comprises between 80 and 91 % by weight of vinyl acetate, between 8 and 20 % of a vinyl ester of a fatty acid of 12 18 carbon atoms, and between 0 and 2 % by weight of crotonic acid.

Suitable vinyl esters of fatty acids of 12 to 18 carbon atoms are vinyl laurate and vinyl stearate. The monomeric compounds can be converted into addition copolymers by conventional addition polymerisation reactions. Solvent, dispersion, and emulsion polymerisation techniques can be used with the aid of the usual addition polymerisation initiators. Moreover, copolymers of vinyl acetate, vinyl laurate, or vinyl stearate and possibly crotonic acid are commercially available in a great variety of relative ratios, which makes their use very economical.

The copolymer is applied to a support in the form of a continuous film from organic solvent solutions by means generally known in the art, such as by spray, brush, roller, wire-rod, doctor blade, air-brush, and wiping techniques.

Appropriate organic solvents for the copolymer are chlorinated aliphatic hydrocarbons such as 1,2-dichloroethane and mixtures of chlorinated aliphatic hydrocarbons and other organic solvents such as ethanol or toluene. As generally known the use of high boiling solvents may prevent the formation of drying structures in the drying area.

An inert, non-photoconductive pigment may be added to the solution. A fine distribution of the pigment can be obtained by grinding the mixture of copolymer and pigment in a sandmill at a previously adapted viscosity of e.g. 100 to 500 cP, either or not with the aid of a dispersing agent. Afterwards the viscosity can be adjusted e.g. by the addition of solvents. This depends, of course, on the nature of the coating system used. In certain cases it may be useful to add small amounts of other polymers to the coating composition of the insulating layer. In this way the viscosity of the coating composition can be adjusted easily, e.g. by the addition of small amounts of high molecular weight polyvinyl acetate.

Suitable non-photoconductive pigments are organic as well as inorganic substances such as silicon dioxide, zinc oxide, titanium dioxide, talcum, calcium carbonate, and diatomaceous earth. Other pigments are described in the United Kingdom Patent No. 908,779 filed Mar. 4, 1959 by Agfa A.G. and United Kingdom Patent No. 1,007,349 filed Oct. 12, 1961 by Gevaert Photo-Production N.V. and in the United Kingdom Patent Application No. 34,046/71 filed July 20, 1971 by Agfa-Gevaert N.V. The grain size of the pigments preferably should not exceed 20 micron in the case of layers that have a thickness of approximatively 15 microns. Preference is given to pigments having a thickness of at most 1 micron.

The use of non-photoconductive pigments in an electrostatic recording paper according to the invention has many advantages. For instance by the addition of pigments a mat aspect can be given to the electrographic recording material. This mat aspect is a result of the rather rough surfaces of the insulating layer caused by the presence of the pigments.

Also in cases where by the presence of a relatively high number of plasticizing groups in the copolymer, as will be described more detailedly hereinafter, the insulating layer would become rather tacky, this could be remedied by the addition of pigments. Furthermore, the presence of pigments in the insulating layers during the development of the electrostatic latent image improves the adhesion of the toner particles to the insulating layer so that a more homogeneous development is obtained. The range of the amounts of pigments is rather large. Depending on the nature of the copolymer used, the size of the pigment particles, and the intended use 0.1 to 400 % of pigment calculated on the weight of copolymer present can be added.

The coated amount of copolymer varies between approximatively 2 and 20 g of dry weight per sq.m., preferably between 4 and 10 g, and even more preferably between 5 and 8 g/sq.m. However, smaller amounts may suffice if a sufficient electrostatic charge can be applied without the risk of breakdown. Thicker layers are less favourable because processing difficulties may arise during charging and development.

The copolymers described have very favourable properties so that they can be used in a dielectric layer instead of the known polymers such as polystyrene, polyvinyl acetate or copolymers of vinyl acetate and crotonic acid. Indeed, the copolymers contain internal plasticizing groups, viz.vinyl laurate or vinyl stearate groups. When coated these copolymers give very smooth surfaces without need of any special drying technique. The flowing properties of the copolymer itself improve this smoothness also during the drying. The induction of a charge during the recording occurs in a far more homogeneously and more uniformly than with a material having a rough surface and a burst structure.

The presence of internal plasticizing groups in the copolymer reduces the curling tendency in the processed material. An internal plasticizer of the abovementioned type is far more favourable for recording the retaining charges than external plasticizers.

Also the presence of vinyl acetate groups and occasionally of crotonic acid groups may improve the adhesion of the copolymer to the paper support. Crotonic acid groups, whenever present, also improve the dispersing effect towards the pigments very favourably.

The high insulating resistance of layers composed of the copolymers makes it possible to apply very thin insulating coatings to a conductive support, so that during charging the insulating layer still possesses sufficient resistance to block the charge carriers of the conductive support. So, a weak ohmic current but also a high polarisation current are obtained, which results in favourable charging characteristics. Thus, an electrographic recording material according to the invention shows favourable charging characteristics. Moreover, it has a very good half-life period, so that a recorded image can be developed even after several minutes and sometimes even after several hours.

Further, it is noteworthy that the static charges applied to the insulating layer cannot be eliminated by the application of tension peaks of an opposite sign. So, it is possible to apply alternating voltages instead of direct current voltage pulses. It appears from the dielectric properties that the insulating coating shows a high signal to noise ratio so that a quick development with high contrast can be realized. Because of the presence in the copolymers of groups having long alkyl chains, an electrophoretic developer dispersed in a chlorinated aliphatic hydrocarbon will show a favourable adhesion. For the development in aqueous medium the amount of the long chain alkyl component in the copolymer can be selected in such a way that an optimal equilibrium of hydrophobic and hydrophilic groups is reached between the uncharged and charged areas.

In general, paper is used as support for the insulating layer, although other supports such as metal foils or sheets, glass, textile materials, and plastic films such as films of cellulose triacetate or of polyesters e.g. of polyethylene terephthalate can also be used. In comparison to the insulating layer, the support must have a much higher electric conductance as will be described more clearly hereinafter.

When used as the support for the insulating layer paper should have a relatively high electroconductivity. This property is determined by measurement of the surface resistance. This measurement is performed by means of a cell, whose electrodes have a width of 1 cm and are placed at a distance of 1 cm from each other. In this way there is a square area of the paper limited at two sides by the electrodes and at the other sides by imaginary lines connecting the edges of opposite electrodes. When a voltage is applied to both electrodes, the current passes through the square of paper and the surface resistance of the paper can be measured. In this case the surface resistance of the paper will be measured in ohms per sq.cm. If the thickness of the paper and its composition are uniform the surface resistance will be the same for measured squares of any size and the surface resistance is then expressed in ohms per square.

The electroconductivity of normal paper is rather low, especially when it has been coated with a covering layer e.g. of polyolefins such as polyethylene or polypropylene. Therefore, the electroconductivity of the paper should be enhanced to obtain an appropriate electrostatic recording material. This can be accomplished e.g. by the addition of salts such as potassium nitrate and/or conductive polymers to the wood pulp during the paper making.

A favourable electroconductivity of the paper can also be obtained by impregnating the paper already formed with solutions of salts and/or conductive polymers e.g. a solution of the conductive polymers described in the United Kingdom Patent Application No. 2134/72 filed Jan. 17, 1972 by Agfa-Gevaert N.V.

Good results were obtained also with paper carrying on at least one side a conductive layer serving as an intermediate layer between the support and the insulating layer. This conductive layer may be composed e.g. of conductive polymers described in the United Kingdom Patent Specification No. 1,271,513 filed June 21, 1968 by Gevaert Photo-Producten N.V., Belgian Patent Specification No. 745,027 filed Jan. 28, 1970 by Gevaert-Agfa N.V. and in the above said United Kingdom Patent Application No. 2134/72 and in the United Kingdom Patent No. 1,208,474 filed Apr. 29, 1968 by Gevaert-Agfa N.V.

Parchment paper as described in the United Kingdom Patent No. 995,491 filed Mar. 16, 1962 by Gevaert Photo-Producter N.V.

In general, the surface resistance of the support at the moment of the recording in fast running devices may amount to at most $1 \times 10^7$ ohm/square. Materials recording more slowly may satisfy, however, if the surface resistivity does not exceed $1 \times 10^{10}$ ohm/sq.

Moreover, the surface resistance of the paper may be lowered temporarily by operating at high relative humidity or by wetting the rear side of the paper by means of water or a polar solvent.

Surface resistance values between $1 \times 10^7$ and $1 \times 10^{10}$ ohm/sq. for the support are not too high to allow a normal charging of the insulating surface. Indeed, it should be taken into account, that the surface resistance values of the insulating layer, when measured in the same way, are normally much higher and will show values of $1 \times 10^{14}$ ohm/sq or even more.

What has been said above concerning the improvement of the conductivity of paper by the application thereto of conductive polymers also applies to other supports. By the application of conductive polymers to at least one side these supports can also obtain a satisfactory electroconductivity. Of course, it may sometimes be necessary, for example when highly hydrophobic films are used as supports e.g. films of polyethylene terephthalate, to provide these film supports first with a known subbing layer or combination of layers to secure a sufficient adhesion of the layers coated thereon.

The electrographic recording material of the invention can be used in an electrostatic printing apparatus wherein an electrostatic charge pattern is built up on the insulating layer by moving the material in close contact with electroconductive styli. The electrostatic charges can be generated by a modulated electron beam, by a modulated corona-charging, or by friction charging.

The electrostatic latent charge pattern formed on the insulating layer can be developed according to techniques known in the art, e.g. by means of a two-component developer composed of a toner and a carrier material as described in United Kingdom Patent No. 679,715 filed Apr. 26, 1949 by Battelle Memorial Institute, by the known cascade development as described in U.S. Pat. No. 2,618,552 of Edward N. Wise issued Nov. 18, 1952 and the French Patent No. 2,120,948 filed Dec. 27, 1971 by Agfa-Gevaert N.V.

Liquid electrophoretic development as described by Metcalfe and Wright in J.Scientific Instruments 33 (1956) p. 194–195 and in J. of Oil & Colour Chemists' Association, 39 (1956), p. 845–856, in the U.S. Pat. No. 2,907,674 of Kenneth A. Metcalfe and Robert J. Wright issued Oct. 6, 1959 and in the United Kingdom Patent No. 1,143,840 filed Jan. 2, 1967 by Agfa A.G. and United Kingdom Patent No. 1,151,141 filed Feb. 4, 1966 by Gevaert-Agfa N.V. can also be used. Aqueous developing agents as described in the United Kingdom Patents Nos. 1,020,503, 1,020,505 both filed Nov. 8, 1961, and United Kingdom Patent No. 1,033,420 filed Nov. 26, 1962 all by Gevaert Photo-Producter N.V. can also be used. Sometimes the powder cloud development as described in the U.S. Pat. No. 2,725,304 of Richard B.Landrigan and Ray E. Tom issued Nov. 29, 1955 can be applied too.

Development of the latent charge pattern can be carried out simultaneously with the formation of the latent charge pattern, or after the formation thereof on the insulating layer.

The developed electrostatic charge pattern can be transferred to an image-receiving layer.

The electrographic recording material of the invention can be used in techniques such as those described by R. M. Schaffert in Electrography, The Focal Press, London and New York (1965) pages 111–126 and by J. J. Rheinfrank and L. E. Walkup at the Thirtheenth Annual Meeting of the Technical Association of the Graphic Arts, June 12–14 (1961) Preprints, pages 112–138, and also as described in the U.S. Pat. No. 3,121,375 of Richard A. Fotland and Virgil E. Straughan issued Feb. 18, 1964 and in microfilm printers and oscilloscope cameras of the electrographic type as described in the United Kingdom Patent No. 1,160,818 filed Dec. 4, 1967 by Varian Associate.

The invention is illustrated by the following examples.

EXAMPLE 1

A parchment paper of 70 g/sq.m having a surface resistance at 50 % of relative humidity of $1.10^8$ ohm/sq was obtained by impregnating the paper in a paper machine with a solution of potassium nitrate.

To the impregnated paper a layer was applied with a wire-rod applicator at a ratio of 8 g/sq.m of dried product from a 3.5 % by weight solution in dichloroethane of FLEXBOND Exp. D-13, which are beads of a copolymer of vinyl acetate and vinyl stearate (85:15 % by weight) marketed by Colton Chemical Co., Cleveland, Ohio, U.S.A.

The insulating layer thus formed on the paper base was capable of accepting an electrostatic charge pattern built up on the layer by means of a modulated electron beam. The charge pattern was held on the insulating layer for several minutes. It could be made visible by means of an electrophoretic developer. A clear sharp image was obtained.

EXAMPLE 2

A paper support was treated so as to give it a good solvent-resistance and to improve its surface resistance. CALGON CONDUCTIVE POLYMER 261, trade name of Calgon Corporation Inc., Pittsburgh, Pa., U.S.A., for a solution containing 39.1 % by weight of active conductive solids, and containing a conductive polymer having recurring units of the following type was used :

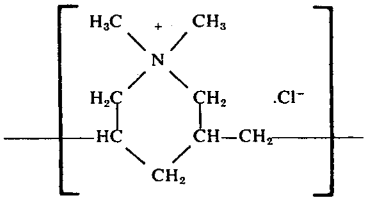

100 ml of this solution was diluted with 500 ml of a mixture of water and ethanol (1:1 by volume). Another solution was made of 400 ml of the same mixture of water and ethanol containing 7 g of POLYVIOL W 48/20, which is the trade name for a polyvinyl alcohol by Wacker Chemie, Munich, West-Germany. Both solutions were mixed and applied to the paper support at a ratio of 3.6 g/sq.m of dried product. The thus coated paper had a surface resistance of $5.10^6$ ohms/sq. at 50 % of relative humidity.

The electroconductive layer was coated at a ratio of 10 g/sq.m. of dried product with a 7 % by weight solution in dichloroethane of a copolymer of vinyl acetate, vinyl laurate, and crotonic acid (90.5:8:1.5 % by weight).

The electrographic recording paper thus formed could be used in a recording apparatus wherein dielectric images were recorded at a voltage of –500 Volt.

EXAMPLE 3

200 g of VULKASIL S, a silicon dioxide pigment having an average particle size of 20 nm, sold by Farbenfabriken Bayer, Leverkusen, West-Germany, were ball-milled for 16 h in dichloroethane.

2 ml of a 100 % by weight solution in ethanol of a mixture of phosphoric acid esters according to the following formulae were added as dispersing agent :

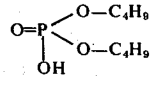

and

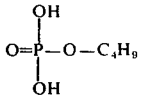

Meanwhile 200 g of copolymer of vinyl acetate, vinyl laurate, and crotonic acid, as described in Example 2, were dissolved in 1.4 liter of dichloroethane, which had been mixed with 100 ml of ethanol. To this solution 30 ml were added of the above pigment dispersion.

This insulating coating composition was applied at a ratio of 10 g/sq.m of dried product to the same paper support as described in Example 2.

The electrographic recording paper thus formed was well adapted for the recording of electrostatic charges. It excels especially in showing no fringe effect at all and in homogeneous recording properties.

EXAMPLE 4

In a mixture of 1.4 liter of dichloroethane and 100 ml of ethanol were dissolved 200 g of VINNAPAS B 100/20 VL, which is a copolymer of vinyl acetate and vinyl laurate (80:20 % by weight) sold by Wacker Chemie, Munich, West-Germany. In this solution 12 g of talcum powder were finely dispersed.

The dispersion formed was applied to a paper base as described in Example 3 and the resulting electrographic recording paper could be used for the recording of electrostatic charges.

EXAMPLE 5

The process of example 4 was repeated with the difference that instead of talcum powder, there was added to the coating composition of the dielectric layer a same amount of calcium carbonate having a particle size lower than 1 micron.

The same favourable results were obtained.

EXAMPLE 6

A wet-strength paper of 60 g/sq.m was impregnated with the reaction product of polyethyleneimine and N-trimethyl-N-glycidyl ammonium chloride at a ratio of 5 g/sq.m. This reaction product was described in the above said United Kingdom Patent Application No. 2134/72.

An aqueous dispersion of 100 g of titanium dioxide having a particle size of 0.12 micron, 50 g of starch, and 150 g of the same reaction product of polyethyleneimine and N-trimethyl-N-glycidyl ammonium chloride was applied at a ratio of 4 g/sq.m of dried product for each side, to both sides of the impregnated paper.

200 g of the copolymer of vinyl acetate, vinyl laurate, and crotonic acid (90.5:8:1.5 % by weight) were dissolved in a mixture of 1.4 liter of dichloroethane and 100 ml of ethanol. 12 g of HYFLO SUPER-CEL, a diatomaceous earth marketed by Johns-Manville, New-York, U.S.A. was added to this solution and the whole mass was ground for a few hours in a ball-mill. The fine dispersion was applied to the above paper support as described in Example 1 at a ratio of 9 g/sq.m of dried product.

With the electrographic recording paper thus formed good results were obtained even at very low relative humidity and with very short pulsating periods in the charging apparatus.

EXAMPLE 7

The process of example 1 was repeated by replacing the copolymer used therein by a copolymer comprising 70 % by weight of vinyl acetate and 30 % by weight of vinyl stearate. Beads of FLEXBOND Exp. B-63 marketed by the above-mentioned Colton Chemical Co. were used.

The same good results were obtained.

EXAMPLE 8

One side of a paper support commonly used in photography was coated at a ratio of 6 g/sq.m of dried product with a mixture containing 2 parts by weight of gelatin, 8 parts by weight of barium sulphate, and 2 parts by weight of CALGON CONDUCTIVE POLYMER (see example 2).

This coating was covered with the insulating layer described in Example 3 at a ratio of 7g/sq.m. of dried product.

With the electrographic recording paper thus formed, electrostatic images could be obtained, which showed no fringe effect at all thanks to the use of a very smooth precoat.

EXAMPLE 9

A longitudinally stretched polyethylene terephthalate film was provided on both sides with a subbing layer consisting of a copolymer of vinyl chloride, vinylidene chloride, n-butylacrylate, and itaconic acid as described in the United Kingdom Patent No. 1,234,755 filed Sept. 28, 1967 by Gevaert-Agfa N.V. The thus coated film was stretched in transverse direction until a film having a thickness of 0.1 mm was obtained. The subbed polyester film was provided on both sides with a conductive coating from a solution in a mixture of methanol and water (1:1 by volume) of polystyrene sulphonic acid, at a ratio of 4 g/sq.m of dried product. A fully sulphonated polystyrene that had been neutralized completely with sodium hydroxide, was used.

One side of the resulting film was covered with the insulating coating composition described in Example 3 at a ratio of 8 g/sq.m of dried product.

The electrographic recording film thus formed was charged electrostatically and developed electrophoretically as described in Example 1.

A very contrasty image, which could be used with transmitted light, was obtained.

EXAMPLE 10

The process of Example 9 was repeated with the difference that the subbing layer and the conductive layer was applied to but one side of the polyethylene terephthalate film.

The same good results were obtained.

We claim:

1. An electrographic recording material comprising a conductive sheet support having a surface resistivity not exceeding about 1 × $10^{10}$ ohm/sq. and carried on said support a non-photoconductive insulating layer consisting essentially of about 2–20 gms dry weight per sq.m. of a copolymer of about 50–91% by weight of vinyl acetate, about 8–50% by weight of a vinyl ester of a $C_{12\text{-}18}$ fatty acid, and about 0–2% by weight of crotonic acid, and up to 400% by weight of said copolymer of a finely divided non-photoconductive pigment.

2. A recording material according to claim 1, wherein the copolymer comprises 80 to 91 % by weight of vinyl acetate, 8 to 20 % by weight of a vinyl ester of a fatty acid of 12 to 18 carbon atoms, and 0 to 2 % by weight of crotonic acid.

3. A recording material according to claim 1, wherein the copolymer comprises 90.5 % by weight of vinyl acetate, 8 % by weight of vinyl laurate, and 1.5 % by weight of crotonic acid.

4. A recording material according to claim 1, wherein the insulating layer comprises a finely divided non-photoconductive pigment in an amount between 0.1 and 400 % by weight with respect to the weight of the copolymer.

5. An electrographic recording material according to claim 1, wherein the support is a paper web.

6. An electrographic recording material according to claim 1, wherein the support is a paper web that has been impregnated with potassium nitrate.

7. The material of claim 1 wherein said pigment has a grain size not in excess of 20 micron.

8. The material of claim 1 wherein said pigment has a grain size not about 1 micron.

9. The material of claim 1 wherein said insulating layer contains about 4–10 gm dry weight per sq.m. of said copolymer.

10. The recording material of claim 1 wherein said vinyl ester is vinyl laurate or vinyl stearate.

11. The recording material of claim 1 wherein said support is a paper web carrying a conductive intermediate layer.

12. An electrographic recording material according to claim 11 wherein said conductive layer is a conductive polymer formed of recurring units of the formula :

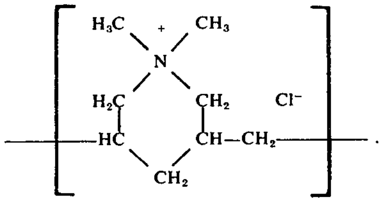

13. In an electrographic recording method in which an electrostatic charge pattern is formed on an electrically insulating non-photoconductive layer, the improvement wherein said insulating layer consists essentially of a copolymer of about 50–91% by weight of vinyl acetate, about 8–50% by weight of a vinyl ester of a $C_{12-18}$ fatty acid, and about 0–2% by weight of crotonic acid, and up to 400% by weight of said copolymer of a finely divided non-photoconductive pigment.

* * * * *